F. E. SICKELS.
STEAM ENGINE.
912.
Reissued Feb. 21, 1860.
2 SHEETS—SHEET 1.
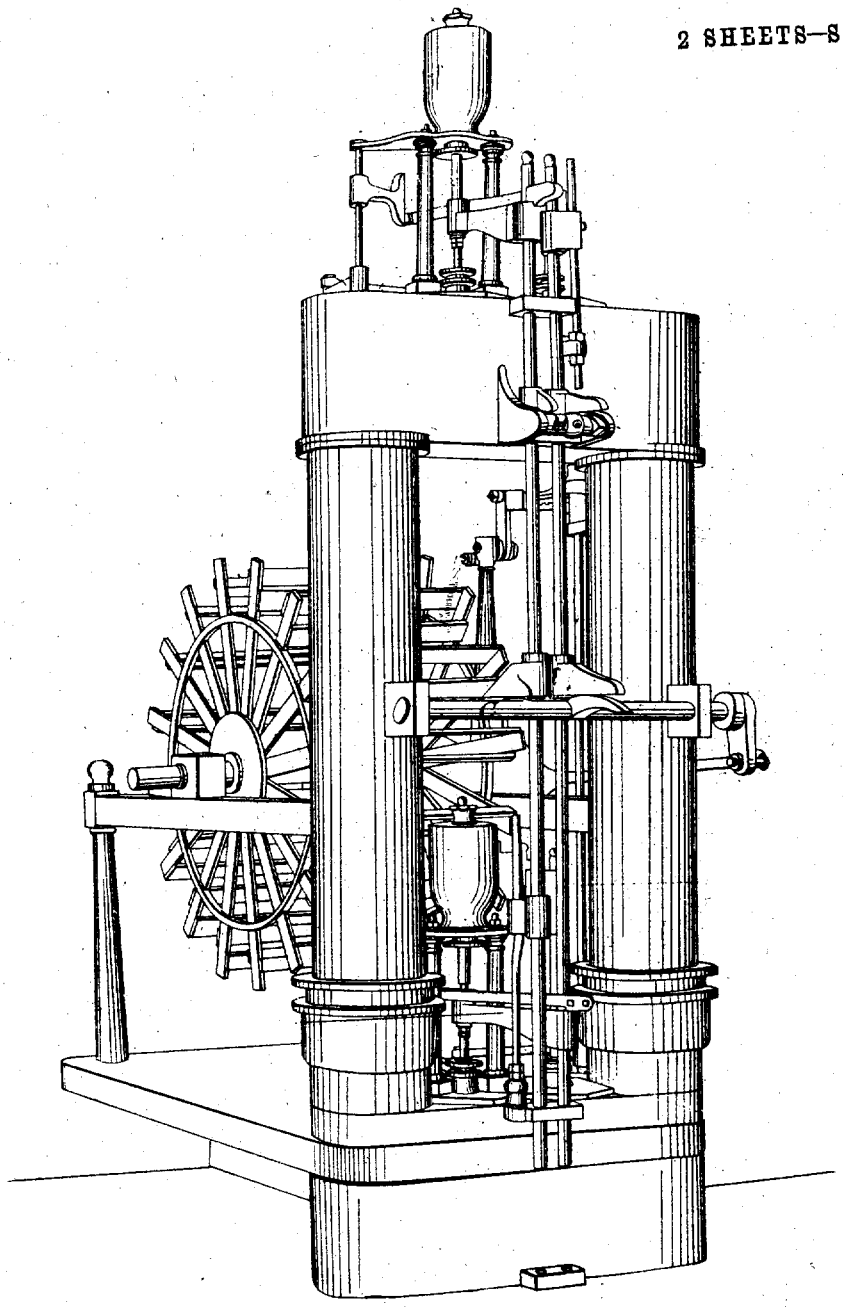
Frederick E. Sickels
Witness
T. E. Sickels
F. J. Murphy 912.
F. E. SICKELS.
STEAM ENGINE.
Reissued Feb. 21, 1860.
2 SHEETS—SHEET 2.
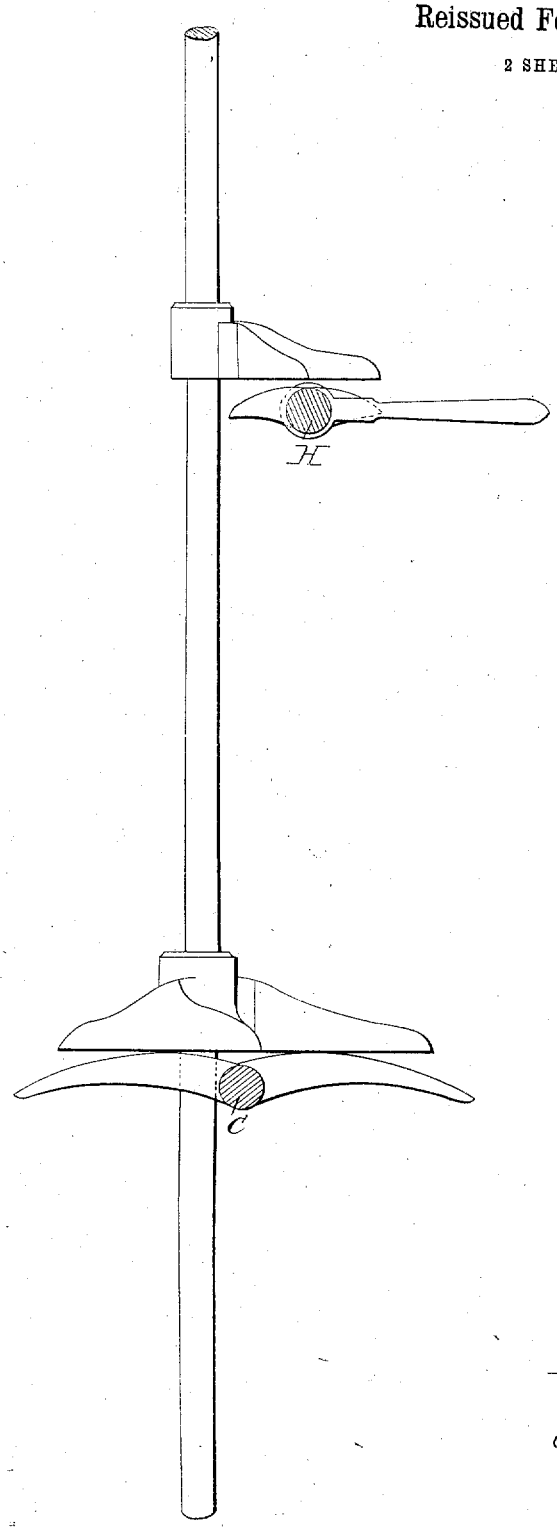
Witnesses:
F. S. Myer
B M Reed
Inventor:
F. E. Sickels

UNITED STATES PATENT OFFICE.

FREDERICK E. SICKELS, OF NEW YORK, N. Y.

IMPROVEMENT IN STEAM-ENGINES.

Specification forming part of Letters Patent No. 4,202, dated September 19, 1845; extended 7 years; Reissue No. 912, dated February 21, 1860.

DIVISION NO. 6.

*To all whom it may concern:*

Be it known that I, FREDERICK ELSWORTH SICKELS, of the city, county, and State of New York, have invented a new and useful Improvement in Steam Engines; and I do hereby declare that the following is a full, clear, and exact description of the character thereof, which distinguishes it from all other things before known, and of the manner of making and using the same, reference being had to the accompanying drawings, which make a part of this specification.

By the method heretofore used in working an engine by hand the weight of each lifting-rod was required to be lifted by a force transmitted through the starting-bar, thereby bringing great labor upon the engineer.

The improvement herein patented consists in counterbalancing the weight of the lifting-rods when working the engine by hand, so that in raising them a weight in descending acts upon the ascending weight, whereby the force necessary to be transmitted through the starting-bar and the labor of the engineer are greatly reduced in working the engineer by hand, but permitting the lifting-rods to exert their full weight in descending to overcome any friction when the engine is hooked on.

Sheet No. 1 shows a view of this improvement in connection with other improvements, for which I have received patents dated the same day as this; but this improvement can be used without them, and it is deemed that further reference to them here will not facilitate the explanation of the improvement herein patented.

In Sheets No. 1 and 2, C is the rock-shaft. H is the hand rock shaft. As this hand rock-shaft is worked either way by hand when the engine is unhooked, the weight of the descending rod acting upon the toe of the rock shaft C assists to raise the ascending rod, thereby relieving the engineer in working the engine by hand; but when the engine is hooked onto the shaft C the weight of the rods in descending exert their full force to overcome any opposing friction.

It is evident that other forms of counterbalance may be used than that here shown, and weights may be used either in connection with or in substitution for the weight of these rods without altering the character of this invention.

What I claim as new, and desire to secure by Letters Patent, is—

Counterbalancing the weight of the lifting-rods so as to relieve the engineer in working the engine by hand, and so that when the engine is hooked on they will exert their full force in descending to overcome any opposing friction.

FREDERICK E. SICKELS.

Witnesses:
C. W. GEDDES,
F. S. MYER.